(Model.)
3 Sheets—Sheet 1.
G. W. STANLEY.
CENTRIFUGAL HONEY EXTRACTOR.
No. 305,483.
Patented Sept. 23, 1884.
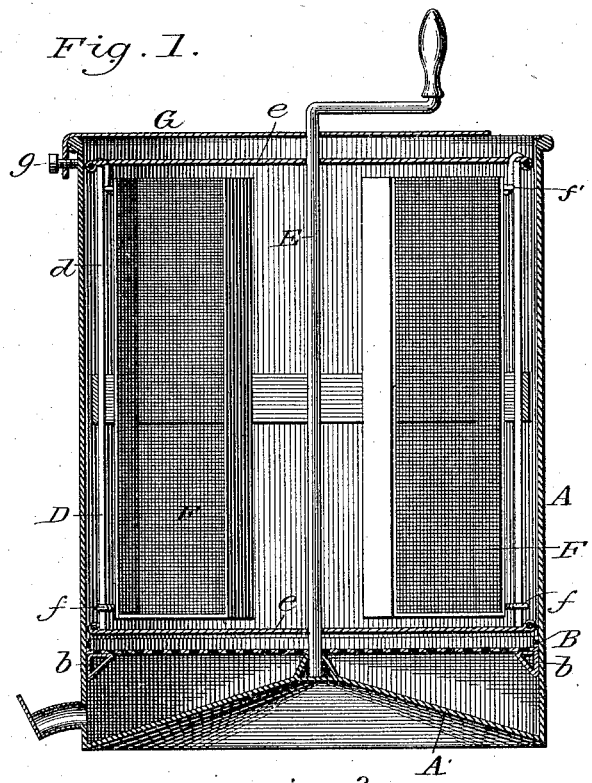
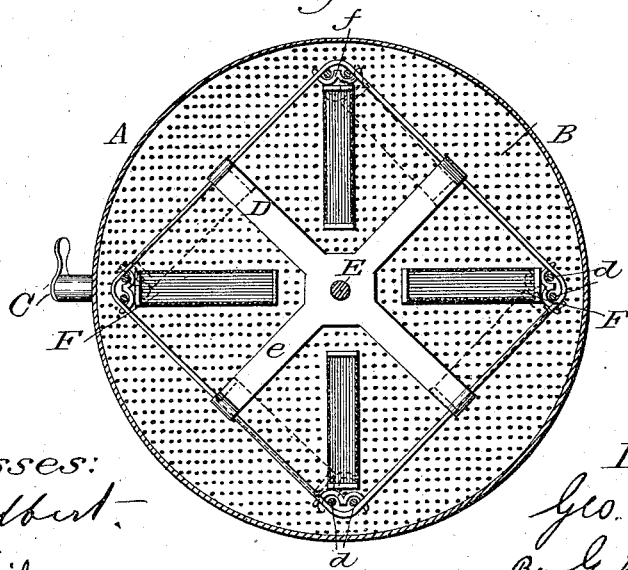
Witnesses:
O. P. Halbert
F. T. Wilcox
Inventor:
Geo. W. Stanley
By G. W. Lord, atty.

(Model.)

3 Sheets—Sheet 2.

G. W. STANLEY.
CENTRIFUGAL HONEY EXTRACTOR.

No. 305,483. Patented Sept. 23, 1884.

Witnesses:
E. P. Halbert
F. T. Wilcox

Inventor:
Geo. W. Stanley
By G. W. Ford Atty.

N. PETERS, Photo-Lithographer, Washington, D. C.

(Model.)
3 Sheets—Sheet 3.
G. W. STANLEY.
CENTRIFUGAL HONEY EXTRACTOR.
No. 305,483. Patented Sept. 23, 1884.
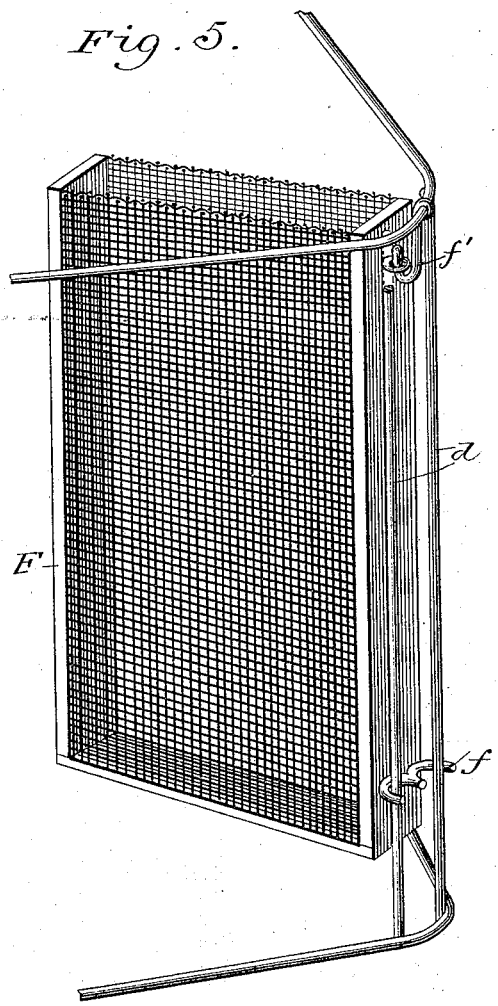
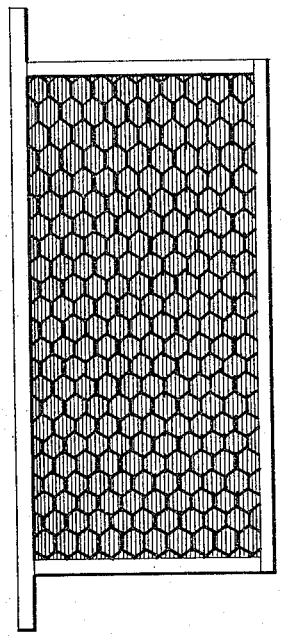

UNITED STATES PATENT OFFICE.

GEORGE W. STANLEY, OF WYOMING, NEW YORK.

CENTRIFUGAL HONEY-EXTRACTOR.

SPECIFICATION forming part of Letters Patent No. 305,483, dated September 23, 1884.

Application filed March 7, 1884. (Model.)

*To all whom it may concern:*

Be it known that I, GEORGE W. STANLEY, a citizen of the United States, residing at Wyoming, in the county of Wyoming and State of New York, have invented a new and useful Improvement in Centrifugal Honey-Extractors, of which the following is a specification.

My invention relates to improvements in machines for extracting honey from the comb after being filled by the bees, and of the class using the revolving and centrifugal force to cause the separation; and the objects of my improvements are, first, to provide a receptacle easy of access, so that the filled comb can be readily placed in position and quickly removed after the honey is withdrawn, all without injury to the comb; second, to provide a simple and effective arrangement whereby the material to be operated upon can be made to automatically present either side of its surface to the centrifugal air-current by the reversal of the motion alone; and, third, to furnish a machine without complication of parts, made detachable for cleaning or other purposes, and with but little frictional resistance when in operation. I attain these objects by the mechanism illustrated in the accompanying drawings, in which—

Figure 2:
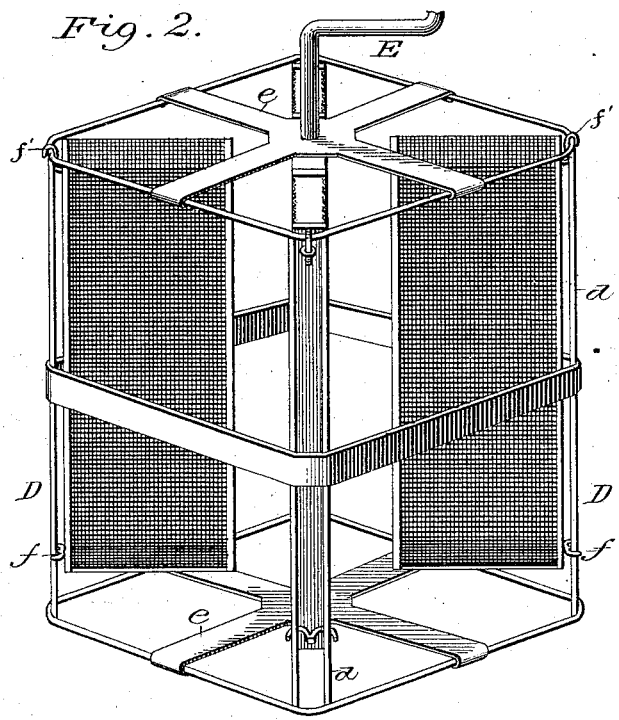
Figure 4:
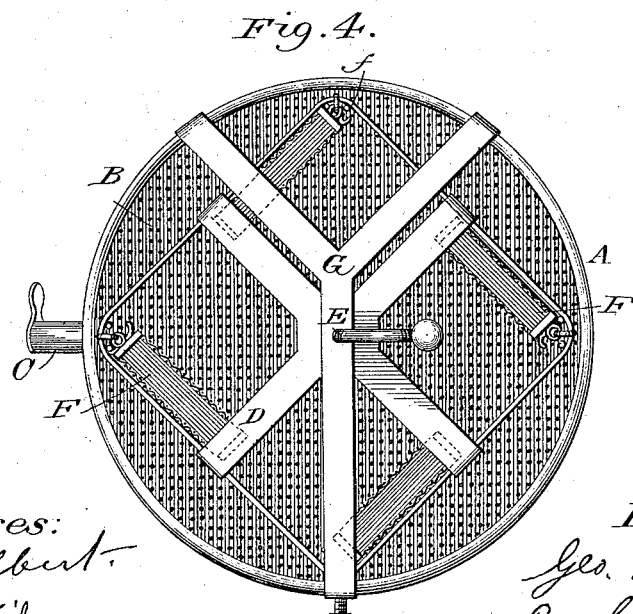

Figure 1 is a vertical longitudinal sectional view. Fig. 2 is a perspective view of the rectangular frame detached from the outer vessel. Fig. 3 is a transverse section of the rectangular frame with the basket-doors in their normal position when in a state of rest, and dotted lines for showing their position when at work. Fig. 4 is a top plan view with the parts in working position. Fig. 5 is a detached view, in perspective, of one of the comb-receptacles or basket-doors, showing the manner of hinging; and Fig. 6 is a side view of the frame within which the honey-comb is secured and as it comes from the hive.

Similar letters refer to similar parts throughout the several views.

A is a cylindrical can, which forms the outer shell, within which the rectangular frame D revolves, and contains the extracted honey, and is provided with a cone-shaped bottom, A', so that the honey gravitates toward the faucet or gate $a$, and can be drawn as desired.

B is a supplementary perforated bottom upon the same horizontal plane with the lower end of the rectangular revolving frame, and rests upon lugs $b$ at a point above the apex of the cone. This perforated bottom can be made of any suitable material for constituting a strainer, through which the honey passes, and can be removed for cleaning or other purposes. If desired, a circumferential flange may be turned up, either perforated or solid, to cause the honey to tend toward the center. A rubber packing or other suitable material can be inserted in the joint between the upturned flange and shell, if a tight joint shall be deemed advisable.

C is the gate through which the honey is drawn.

D is a skeleton frame, preferably made rectangular in form laterally, and is provided at each corner with two vertical rods, $d$, for a purpose hereinafter explained. This frame D may have, in addition to the top and bottom tie-rods, a central bar or bars to more securely strengthen the said frame.

E is a vertical shaft, upon which the skeleton frame is mounted, and in this instance is provided with a hand-crank, by means of which the frame is made to revolve.

$e$ are spiders or tie-bars—one at the top and the other at the bottom of the skeleton frame—through which the shaft E passes, and to which the spiders are securely fastened, so as to form arms that unite the frame to the shaft and cause all to revolve together when power is applied.

F are comb-baskets, hinged one to each corner of the revolving frame, within which are placed the frames containing the honey-comb (see Fig. 6) when it is desired to remove the honey from the comb, as will be hereinafter explained. $f f'$ are hinges upon the baskets F, the one $f$ being forked or provided with two bearings.

It will be observed that when in a state of rest a branch or fork of the hinge $f$ impinges against each of the vertical corner-rods $d$ thus holding the comb-basket in a line diagonal with the square of the frame, with the free edge toward the center of the said frame and in a line diagonal with the sides. When this skeleton frame is made to revolve, the resistance caused by the air striking the side of the hinged comb-basket throws the said basket back side by side with the revolving frame, with only one of the forks resting against its corresponding rod, and consequently off from the vertical center, where it remains during the continuance of the revolution. A reverse motion of the frame causes a corresponding reversal of the doors or comb-baskets, which position is retained as long as the motion continues. When the revolution ceases, the baskets return to their normal position toward the center, as before explained. G is a Y-shaped bar, through which passes the vertical shaft E. This Y has its forked ends turned down, so as to hook over the strengthening-rib upon the top of the shell A, with a corresponding bend upon the single end, which is provided with a set-screw, g, by means of which the revolving frame is centrally secured to the shell, as well as made removable at will.

If desired, a pinion may be secured to the shaft G, (the crank being removed,) and a corresponding gear-wheel placed upon a horizontal shaft, mounted in bearings upon the Y, so as to increase the motion of the revolving mechanism, the power of course being applied to the horizontal shaft—a method I consider preferable in practice.

Hand or other power may be used, as desired.

The operation is essentially as follows: The frame containing the comb and inclosed honey (shown in Fig. 6) is taken from the hive, where it has been filled by the bees, and, after removing the caps to the cells, is placed one frame within each comb-basket or door. Power is applied to the revolving frame, which causes the basket-doors to fall back against the sides of the revolving rectangular frame, as hereinbefore described, and by the centrifugal force the honey is removed from the cells of the comb next to the skeleton frame; and when done the motion is reversed, causing the baskets to present the opposite side next to the frame, and as the tendency in all revolving bodies is to throw off from the center the honey is quickly removed from the cells upon the outside of the circle, and when done the frames containing the comb can be removed and placed in the hive for refilling, and the strained honey drawn off through the gate into the storing-receptacle.

Should it not be expedient to have a large frame filled, smaller ones may be substituted, and cross-bars can be placed within the basket, upon which the frame can rest, so as to to be easy of access.

It will be seen that in practice these basket-doors are automatic in their operation, and, being made of wire-cloth or equivalent material, both sides of the comb (by the revolution) can have the honey removed from the cells without injury to the comb, thus saving the comb, as well as expediting the work, as the doors do not have to be turned by hand, or by other mechanism, except that employed in causing the frame to revolve.

I do not broadly claim a centrifugal honey-extractor having swinging comb-baskets hinged to a revolving frame, as that is not new; but, as far as I am aware, I am the first to organize a honey-extractor that will, by centrifugal force alone, swing the comb-baskets from an axial central position, while in a state of rest, to a peripheral following in line when in motion, and again to automatically assume the normal position upon the arrest of the actuating force.

Having now described my invention, what I claim as new, and desire to secure by Letters Patent, is—

1. In a honey-extractor, the revolving rectangular frame having two parallel supporting-rods at each corner, with a perforated comb-basket hinged thereto by one single pivotal hinge and one double or crotched hinge, all arranged and operating substantially as described, and for the purpose herein set forth.

2. In a centrifugal honey-extractor, the revolving frame provided with the hinged basket-doors, that tend to the axial center when in a state of rest, and when in motion will automatically swing and follow in the peripheral line of the revolution by the actuating-power alone, substantially as herein described and set forth.

GEO. W. STANLEY.

Witnesses:
G. W. FORD,
BUTLER WARD.